(12) United States Patent
Umakoshi et al.

(10) Patent No.: US 10,604,600 B2
(45) Date of Patent: Mar. 31, 2020

(54) PHOTOCURABLE RESIN COMPOSITION AND CURED PRODUCT OF SAME

(71) Applicant: OSAKA SODA CO., LTD., Osaka (JP)

(72) Inventors: Hideaki Umakoshi, Osaka (JP); Naruhito Iwasa, Osaka (JP); Hiroki Yamamoto, Osaka (JP)

(73) Assignee: OSAKA SODA CO., LTD., Osaka (JP)

( * ) Notice: Subject to any disclaimer, the term of this patent is extended or adjusted under 35 U.S.C. 154(b) by 0 days.

(21) Appl. No.: 16/082,743

(22) PCT Filed: Mar. 10, 2017

(86) PCT No.: PCT/JP2017/009741
§ 371 (c)(1),
(2) Date: Sep. 6, 2018

(87) PCT Pub. No.: WO2017/169661
PCT Pub. Date: Oct. 5, 2017

(65) Prior Publication Data
US 2019/0100608 A1 Apr. 4, 2019

(30) Foreign Application Priority Data

Mar. 31, 2016 (JP) ................................ 2016-071789

(51) Int. Cl.
| | | |
|---|---|---|
| *C08F 2/46* | (2006.01) | |
| *C08F 2/50* | (2006.01) | |
| *C08G 61/04* | (2006.01) | |
| *C08F 18/08* | (2006.01) | |
| *C08F 2/44* | (2006.01) | |
| *C08F 2/48* | (2006.01) | |
| *C09J 4/06* | (2006.01) | |
| *C09J 11/06* | (2006.01) | |
| *C09J 131/06* | (2006.01) | |
| *C09J 131/04* | (2006.01) | |
| *C09J 133/10* | (2006.01) | |

(52) U.S. Cl.
CPC ............... *C08F 18/08* (2013.01); *C08F 2/44* (2013.01); *C08F 2/48* (2013.01); *C09J 4/06* (2013.01); *C09J 11/06* (2013.01); *C09J 131/04* (2013.01); *C09J 131/06* (2013.01); *C09J 133/10* (2013.01)

(58) Field of Classification Search
CPC ..... C08F 18/08; C08F 2/44; C08F 2/48; C09J 4/06; C09J 133/10; C09J 131/04; C09J 11/06; C09J 131/06

USPC ................................ 522/182, 178, 1; 520/1
See application file for complete search history.

(56) References Cited

U.S. PATENT DOCUMENTS

| | | | |
|---|---|---|---|
| 2003/0096172 A1* | 5/2003 | Ichihashi | G03F 7/001 430/1 |
| 2017/0313795 A1 | 11/2017 | Yokoyama et al. | |
| 2018/0186064 A1* | 7/2018 | Hashidate | B29C 63/34 |
| 2019/0135955 A1 | 5/2019 | Yokoyama et al. | |

FOREIGN PATENT DOCUMENTS

| | | | | |
|---|---|---|---|---|
| JP | 2001-056631 | * | 2/2001 | |
| JP | 2001-56631 | | 2/2001 | |
| JP | 2001-247804 | | 9/2001 | |
| JP | 2012-116868 | | 6/2012 | |
| JP | 2013-181145 | | 9/2013 | |
| JP | 5501092 | | 5/2014 | |
| WO | 2016/125661 | | 8/2016 | |
| WO | WO-2017013950 A1 | * | 1/2017 | ............. B29C 63/34 |

OTHER PUBLICATIONS

Ichihashi et al, JP 2001-056631 Machine Translation, Feb. 27, 2001 (Year: 2001).*
International Search Report dated Apr. 4, 2017 in International (PCT) Application No. PCT/JP2017/009741.
Extended European Search Report dated Sep. 23, 2019 in corresponding European Application No. 17774205.3.
Ishii et al., "Studies on resins of UV curable lithographic inks", Journal of Photopolymer Science and Technology, Technical Association of Photopolymers, vol. 2, No. 2, 1989, pp. 211-216.

* cited by examiner

*Primary Examiner* — Jessica Whiteley
(74) *Attorney, Agent, or Firm* — Wenderoth, Lind & Ponack, L.L.P.

(57) ABSTRACT

The objection of the present invention is to provide a photocurable resin composition having deep curability. The photocurable resin composition comprises an allyl polymer (a) produced by polymerization of an allyl compound represented by the following formula (1), a photocurable compound (b), and a photopolymerization initiator (c). In the formula, n represents an integer of 2 to 4; Z is selected from a binding site, an n-valent aliphatic chain hydrocarbon group optionally having a hydroxyl group, an n-valent alicyclic hydrocarbon group optionally having an alkyl group, and an n-valent aromatic hydrocarbon group optionally having an alkyl group; n is 2 and two —COOCH$_2$CH=CH$_2$ moieties are directly bonded to each other when Z is a binding site.

$$Z(\text{—COOCH}_2\text{CH}=\text{CH}_2)_n \qquad (1)$$

6 Claims, No Drawings

PHOTOCURABLE RESIN COMPOSITION AND CURED PRODUCT OF SAME

TECHNICAL FIELD

The present invention relates to a photocurable resin composition and a cured product thereof. More specifically, the present invention relates to a photocurable resin composition which has satisfactory deep curability even in the case of being cured into a thick film (e.g., a film of 10 μm to 1 mm), and a cured product thereof.

BACKGROUND ART

Various curable resin compositions that can be cured by light (hereinafter referred to as photocurable resin compositions) (e.g., ultraviolet-curable resin compositions) have been used in inks, coating materials, adhesives, photoresists, and other applications. The photocurable resin compositions are highly valued since, for example, the photocurable resin compositions can be cured in a short time because of the high cure rate; the photocurable resin compositions are environment-compatible because of no use of solvents; and the photocurable resin compositions can save resources and energy.

A high-pressure mercury lamp, a xenon lamp, or the like, which has a relatively high irradiation intensity, is used as a light source for curing the photocurable resin composition. Mercury or rare elements are used for the light sources, and the light sources damage the environment. In recent years, a light emitting diode has been used as a light source with a low environmental load. The light emitting diode has, however, weak irradiation intensity and it is difficult to cure the photocurable resin sufficiently. Thus, the use of the light emitting diode causes insufficient surface curing and insufficient deep curing. Patent Documents 1 and 2 propose methods to solve the above-mentioned problems caused by using the light source having weak irradiation intensity. Patent Document 1 propose to use an isocyanurate derivative having a specific structure and Patent Document 2 propose to use a polymer produced by polymerizing a specific compound, to improve the deep curability of the photocurable resin composition.

PRIOR ART DOCUMENT

Patent Document

Patent Document 1: Japanese Patent Application No. 5501092
Patent Document 2: Japanese Unexamined Patent Application Publication No. 2001-247804

SUMMARY OF THE INVENTION

Problems to be Solved by the Invention

Even the methods disclosed in Patent Documents 1 and 2, however, have not sufficiently improved the deep curability of the photocurable resin composition. Accordingly, it is desired to develop a photocurable resin composition having further improved deep curability.

Solutions to the Problems

As a result of intensive studies, the present inventors have found that a photocurable resin composition containing an allyl polymer (a) produced by polymerization of an allyl compound having a specific structure has excellent deep curability, thereby achieving the present invention.

The present invention provides a photocurable resin composition comprising:
an allyl polymer (a) produced by polymerization of an allyl compound represented by the following formula (1):

wherein n represents an integer of 2 to 4; Z is selected from a binding site, an n-valent aliphatic chain hydrocarbon group optionally having a hydroxyl group, an n-valent alicyclic hydrocarbon group optionally having an alkyl group, and an n-valent aromatic hydrocarbon group optionally having an alkyl group; n is 2 and two —COOCH$_2$CH=CH$_2$ moieties are directly bonded to each other when Z is a binding site;
a photocurable compound (b); and
a photopolymerization initiator (c).

The present invention can provide a photocurable resin composition having more excellent deep curability in any one of the following cases.

The allyl polymer (a) preferably has the SP value of 9.5 to 12.5.

The allyl compound represented by the formula (1) is preferably any one selected from diallyl oxalate, diallyl malonate, diallyl succinate, diallyl glutarate, diallyl adipate, diallyl pimelate, diallyl suberate, diallyl azelate, diallyl sebacate, diallyl fumarate, diallyl maleate, diallyl malate, diallyl tartrate, triallyl citrate, and diallyl itaconate.

The allyl compound represented by the formula (1) is preferably any one of compound represented by the following formulae (2) to (9):

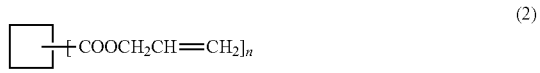

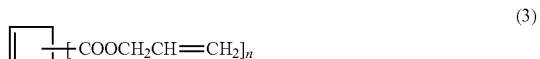

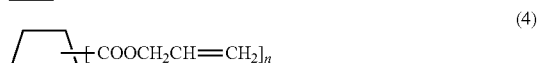

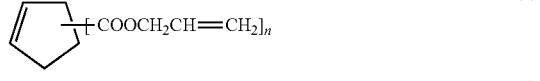

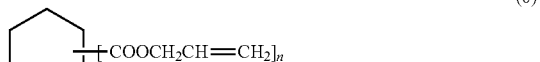

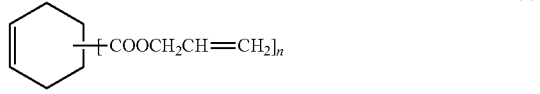

wherein n represents an integer of 2 to 4.

Z in the formula (1) is preferably the aromatic hydrocarbon group and the aromatic hydrocarbon group preferably has 6 to 20 carbon atoms.

The photocurable resin composition is preferably used as an adhesive.

Additionally, the present invention provides a cured product obtained by curing the photocurable resin composition.

Effect of the Invention

The present invention provides a photocurable resin composition exhibiting excellent deep curability even when a light source having a relatively weak irradiation intensity such as a light emitting diode is used.

MODE FOR CARRYING OUT THE INVENTION

The present invention will be described hereinbelow in detail.

Photocurable Resin Composition

The photocurable resin composition of the present invention comprises an allyl polymer (a) produced by polymerization of an allyl compound represented by formula (1), a photocurable compound (b), and a photopolymerization initiator (c).

Allyl Polymer (a)

The allyl polymer (a) of the present invention can be used without limitation as long as it is a polymer produced by polymerization of an allyl compound represented by the following formula (1);

(1)

wherein n represents an integer of 2 to 4; Z is selected from a binding site, an n-valent aliphatic chain hydrocarbon group optionally having a hydroxyl group, an n-valent alicyclic hydrocarbon group optionally having an alkyl group, and an n-valent aromatic hydrocarbon group optionally having an alkyl group; n is 2 and two —COOCH$_2$CH═CH$_2$ moieties are directly bonded to each other when Z is a binding site.

The term "n-valent" is based on the number of COOH moieties bonded to Z, and it refers to the number of —COOCH$_2$CH═CH$_2$ moieties bonded to Z in formula (1). The expression "an n-valent aliphatic chain hydrocarbon group optionally having a hydroxyl group" suggests that the aliphatic chain hydrocarbon group may not have a substituent other than a hydroxyl group. However, as can be clearly seen from the fact that the expression does not exclude bonding of the other substituent, an aspect in which a substituent other than a hydroxyl group is bonded to the aliphatic chain hydrocarbon group is not excluded. Similarly, the expression "an n-valent alicyclic hydrocarbon group optionally having an alkyl group" or "an n-valent aromatic hydrocarbon group optionally having an alkyl group" suggests that the alicyclic hydrocarbon group or the aromatic hydrocarbon group may not have a substituent other than an alkyl group. However, an aspect in which a substituent other than an alkyl group is bonded to the alicyclic hydrocarbon group or the aromatic hydrocarbon group is not excluded.

The allyl polymer (a) preferably has the SP value in the range of 9.5 to 12.5, and more preferably 10 to 12. The allyl polymer (a) having the SP value in this range has excellent compatibility with the photocurable compound (b) used in the photocurable resin composition, so that the use facilitates preparation of the photocurable resin composition. In addition, the use of the allyl polymer (a) makes it possible to conveniently apply a coating of the photocurable resin composition onto a desired base material. When the allyl polymer (a) has the SP value of less than 9.5, it has poor compatibility with the photocurable compound (b). As a result, a mixture thereof becomes cloudy, and a cohesive force of a coated film obtained by curing becomes weak, which may easily cause detachment of the coated film from a base material. When the allyl polymer (a) has the SP value of more than 12.5, it has poor compatibility with the photocurable compound (b), so that a mixture thereof may become cloudy or may be separated into two liquids. The upper limit of the SP value is further preferably 10.7 or less, and even more preferably 10.5 or less. The SP value can be calculated by Fedors' method (see "Polymer Engineering and Science", 14, (2), 147 (1974)).

The allyl polymer (a) preferably has a weight average molecular weight of 500,000 or less, and more preferably 400,000 or less. When Z in the formula (1) is an alicyclic hydrocarbon group or an aromatic hydrocarbon group, the allyl polymer (a) preferably has a weight average molecular weight of 2,000 to 150,000, and more preferably 5,000 to 140,000. In particular, when n is 2 and Z is an alicyclic hydrocarbon group having 4 to 10 carbon atoms, the allyl polymer (a) preferably has a weight average molecular weight of 8,000 or more, more preferably 10,000 or more, preferably 120,000 or less, and more preferably 100,000 or less. When Z in the formula (1) is an aliphatic chain hydrocarbon group, the allyl polymer (a) preferably has a weight average molecular weight of 5,000 to 400,000. In particular, when n is 2 and Z is an aliphatic chain hydrocarbon group having 2 to 8 carbon atoms, the allyl polymer (a) has a weight average molecular weight of preferably 8,000 or more, more preferably 10,000 or more, and preferably 200,000 or less, more preferably 150,000 or less, further preferably 100,000 or less, and even more preferably 70,000 or less. In the description, "weight average molecular weight" can be determined by using gel permeation chromatography (GPC system manufactured by Shimadzu Corporation) at room temperature and then calculating the chromatogram by using a standard polystyrene calibration curve.

The amount of the monomer unit based on the allyl compound represented by the above formula (1) is preferably 20% by weight or more, more preferably 50% by weight or more, further preferably 80% by weight or more, particularly preferably 98% by weight or more, and may be 100% by weight, based on 100% by weight of the allyl polymer (a). The allyl polymer (a) may be a copolymer of two or more different kinds of compounds among the allyl compounds of the above formula (1), that is, a copolymer of two or more kinds of compounds selected from the allyl compound in which Z is the binding site or the n-valent aliphatic chain hydrocarbon group optionally having a hydroxyl group; the allyl compound in which Z is the n-valent alicyclic hydrocarbon group optionally having an alkyl group; and the allyl compound in which Z is the n-valent aromatic hydrocarbon group optionally having an alkyl group. The allyl polymer (a) may be a copolymer of the allyl compound of the above formula (1) and a compound other than the allyl compounds of formula (1), for example, a monomer having a C═C double bond such as a styrene monomer. A homopolymer produced by homopolymerizing one of the allyl compounds of formula (1) is particularly preferable.

The amount of the allyl polymer (a) is preferably 1% to 60% by weight, more preferably 1% to 55% by weight, further preferably 1% to 50% by weight, of the total amount of the photocurable resin composition. When the amount of the allyl polymer (a) is more than 60% by weight, the allyl polymer (a) has lower compatibility with the photocurable compound (b). In addition, the photocurable resin composition has higher viscosity, so that it has poor handleability. The allyl polymer (a) in an amount of less than 1% by weight may not allow the photocurable resin composition to have sufficient drying properties. The amount of the allyl polymer (a) is more preferably 5% by weight or more, further preferably 10% by weight or more, and even more preferably 15% by weight or more, of the total amount of the photocurable resin composition.

From the view point of further improvement of deep curability, Z in the above formula (1) is preferably the binding site, the n-valent aliphatic chain hydrocarbon group optionally having a hydroxyl group, the n-valent alicyclic hydrocarbon group optionally having an alkyl group, or the n-valent aromatic hydrocarbon group optionally having an alkyl group.

(i) Binding Site or n-Valent Aliphatic Chain Hydrocarbon Group Optionally Having a Hydroxyl Group When Z is the binding site or the aliphatic chain hydrocarbon group, the compound of formula (1) is an allyl ester of an aliphatic carboxylic acid. The allyl ester of an aliphatic carboxylic acid has high compatibility with the photocurable compound (b) and is particularly effective in enhancing physical properties of a photocured product. When Z in the above formula (1) is the n-valent aliphatic chain hydrocarbon group optionally having a hydroxyl group, Z may have 1 to 18 carbon atoms, preferably 2 to 12 carbon atoms, more preferably 2 to 8 carbon atoms, and most preferably 3 to 6 carbon atoms. The aliphatic chain hydrocarbon may be linear or branched, and is preferably linear. The aliphatic chain hydrocarbon group may be a saturated n-valent aliphatic chain hydrocarbon group or may partially have an unsaturated bond, and is preferably saturated. When Z in formula (1) is the n-valent aliphatic chain hydrocarbon group, n is preferably 2 or 3, and more preferably 2. That is, an aliphatic chain hydrocarbon group in which Z has 2 to 8 carbon atoms, and n is 2 or 3, particularly 2, is further preferable.

The n-valent aliphatic chain hydrocarbon group may or may not have a hydroxyl group. One or more hydroxyl groups may be bonded at a substitutable position of the aliphatic chain hydrocarbon group. Further, the n-valent aliphatic chain hydrocarbon group may or may not have a substituent other than the hydroxyl group such as an alkoxy group having 1 to 6 carbon atoms, and a halogen atom.

When Z in the above formula (1) is the binding site or the n-valent aliphatic chain hydrocarbon group, specific examples of the allyl compound include diallyl oxalate in which Z is the binding site; diallyl malonate, diallyl succinate, diallyl glutarate, diallyl adipate, diallyl pimelate, diallyl suberate, diallyl azelate, and diallyl sebacate as a compound in which Z is a saturated linear aliphatic hydrocarbon group and n is 2; diallyl fumarate and diallyl maleate as a compound in which Z is an unsaturated linear aliphatic hydrocarbon group and n is 2; diallyl malate and diallyl tartrate as a compound in which Z is a saturated linear aliphatic hydrocarbon group having a hydroxyl group and n is 2; triallyl citrate as a compound in which Z is a saturated linear aliphatic hydrocarbon group having a hydroxyl group and n is 3; diallyl itaconate as a compound having a hydrocarbon group including an unsaturated bond; and tetraallyl 1,2,3,4-butanetetracarboxylate as a compound in which n is 4. Among them, diallyl succinate, diallyl adipate, diallyl malate, and triallyl citrate are preferable in terms of compatibility with various photocurable compounds (b), and of deep curability and quick-drying properties of the photocurable resin composition. From the viewpoint of ease of handling, diallyl succinate, diallyl adipate, and diallyl malate are more preferable, and of these, diallyl succinate and diallyl adipate are particularly preferable. The allyl compound in which Z is the binding site or the n-valent aliphatic chain hydrocarbon group optionally having a hydroxyl group is hereinafter referred to as "aliphatic allyl compound" in some cases.

(ii) n-Valent Alicyclic Hydrocarbon Group Optionally Having an Alkyl Group

When Z in the above formula (1) is the n-valent alicyclic hydrocarbon group optionally having an alkyl group, Z preferably has 3 to 18 carbon atoms, more preferably 4 to 12 carbon atoms, further preferably 4 to 10 carbon atoms, and even more preferably 5 to 7 carbon atoms.

The n-valent alicyclic hydrocarbon group may be a saturated n-valent alicyclic hydrocarbon group or may partially have an unsaturated bond. The number of unsaturated bonds is preferably 2 or less, more preferably 1 or less, and particularly preferably 0. In the present invention, "alicyclic" means a hydrocarbon group having a cyclic structure but not having aromatic properties.

The number of rings may be 3 or more, and is preferably 1 or 2 and particularly preferably 1. When the number of rings is 2 or more, the n-valent alicyclic hydrocarbon group may form a condensed ring system, a bridged ring system, or both. When the number of rings is 2 or more, the n-valent alicyclic hydrocarbon group preferably forms a bridged ring system.

When Z in formula (1) is the n-valent alicyclic hydrocarbon group optionally having an alkyl group, n is preferably 2 or 3, and more preferably 2.

The n-valent alicyclic hydrocarbon group may or may not have an alkyl group. The alkyl group may be linear or branched and has 1 to 10 carbon atoms, preferably has 1 to 5 carbon atoms, and is more preferably methyl group or ethyl group. One or more alkyl groups may be bonded at a substitutable position of the alicyclic hydrocarbon group. Further, the n-valent alicyclic hydrocarbon group may or may not have a substituent other than the alkyl group.

When Z in the above formula (1) is the n-valent alicyclic hydrocarbon group, specific examples of the allyl compound may include compounds of the following general formulae (2) to (9):

(2)

(3)

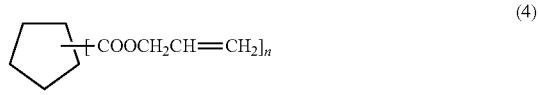

(4)

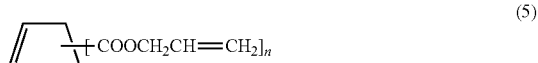

(5)

(6)

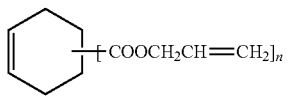
(7)

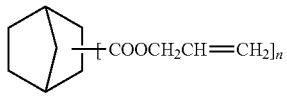
(8)

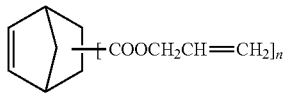
(9)

wherein n represents an integer of 2 to 4.

The ring system of the compounds of formulae (2) to (9) may form a bridge part. Examples of the ring system forming the bridge part structure include adamantane and norbornane.

Any combination of the positions of the COOCH$_2$CH=CH$_2$ groups substituted on the rings in formulae (2) to (9) may be practicable. The allyl compound may be a mixture of those compounds. Particularly, when two COOCH$_2$CH=CH$_2$ groups are bonded to a six-membered ring, the two COOCH$_2$CH=CH$_2$ groups may be in the ortho (substituted in the 1- and 2-positions), meta (substituted in the 1- and 3-positions), or para (substituted in the 1- and 4-positions) position, preferably in the ortho (substituted in the 1- and 2-positions) or para (substituted in the 1- and 4-positions) position.

When Z in the above formula (1) is the n-valent alicyclic hydrocarbon group, specific examples of the allyl compound may include diallyl cyclobutanedicarboxylate, diallyl cyclopentanedicarboxylate, diallyl cyclohexanedicarboxylate (diallyl hexahydrophthalate), diallyl norbornanedicarboxylate, diallyl cyclobutenedicarboxylate, diallyl cyclopentenedicarboxylate, diallyl cyclohexenedicarboxylate (diallyl tetrahydrophthalate), diallyl norbornenedicarboxylate, 3-methyl-hexahydro-1,2-diallyl phthalate, 4-methyl-hexahydro-1,2-diallyl phthalate, 3-methyl-1,2,3,6-tetrahydro-1,2-diallyl phthalate, 4-methyl-1,2,3,6-tetrahydro-1,2-diallyl phthalate, 3,6-endomethylene-3-methyl-1,2,3,6-tetrahydro-1,2-diallyl phthalate, 3,6-endomethylene-4-methyl-1,2,3,6-tetrahydro-1,2-diallyl phthalate, diallyl 4-cyclohexene-1,2-dicarboxylate, and diallyl 2-cyclohexene-1,2-dicarboxylate. Z preferably has a cyclic structure without an unsaturated bond and has 4 to 7 carbon atoms, further 5 or 6 carbon atoms, and most preferably 6 carbon atoms. Z more preferably has a cyclic structure containing no unsaturated bond and having 4 to 7 carbon atoms, which forms four- to seven-membered ring except a bridge portion. Z further preferably has a cyclic structure containing no unsaturated bond and having 5 to 6 carbon atoms, which forms five- to six-membered ring except a bridge portion, and most preferably six-membered ring. Of these, diallyl 1,2-cyclohexanedicarboxylate, diallyl 1,3-cyclohexanedicarboxylate, diallyl 1,4-cyclohexanedicarboxylate, and diallyl norbornanedicarboxylate are preferable.

The allyl compound in which Z is the n-valent alicyclic hydrocarbon group optionally having the alkyl group is hereinafter referred to as "alicyclic allyl compound" in some cases.

(iii) n-Valent Aromatic Hydrocarbon Group Optionally Having an Alkyl Group

When Z in the above formula (1) is the n-valent aromatic hydrocarbon group optionally having an alkyl group, Z is preferably any of aromatic hydrocarbon groups having 6 to 20 carbon atoms, and more preferably any of aromatic hydrocarbon group having 6 to 12 carbon atoms.

When Z in formula (1) is the n-valent aromatic hydrocarbon group, n is preferably 2 or 3, and more preferably 2.

The n-valent aromatic hydrocarbon group may or may not have an alkyl group. The alkyl group may be linear or branched and have 1 to 10 carbon atoms, preferably has 1 to 5 carbon atoms, and is more preferably methyl group or ethyl group. One or more alkyl groups may be bonded at a substitutable position of the aromatic hydrocarbon group. The n-valent aromatic hydrocarbon group may or may not have a substituent other than the alkyl group.

When Z in the above formula (1) is the n-valent aromatic hydrocarbon group optionally having the alkyl group, any combination of the positions of the allyl ester (COOCH$_2$CH=CH$_2$) groups substituted on the ring of Z may be practicable. The allyl compound may be a mixture of those compounds. In particular, when two COOCH$_2$CH=CH$_2$ groups are bonded to a six-membered ring, the two COOCH$_2$CH=CH$_2$ groups may be in the ortho, meta, or para position, preferably in the ortho or meta position.

When Z in the above formula (1) is the n-valent aromatic hydrocarbon group, specific examples of the allyl compound include diallyl phthalate, diallyl isophthalate, and diallyl terephthalate. Of these, diallyl phthalate and diallyl isophthalate are preferable.

The allyl compound in which Z is the n-valent aromatic hydrocarbon group optionally having the alkyl group is hereinafter referred to as "aromatic allyl compound" in some cases.

(iv) Method of Preparing the Allyl Compound

The allyl compound of the present invention can be prepared by a reaction between a carboxylic acid compound represented by the following general formula (10) or an anhydride thereof and an allyl halide or an allyl alcohol in the presence of an acidic substance, a basic substance, a catalyst, a solvent, and the like which can be used as required. The carboxylic acid compound represented by general formula (10) is available as a reagent or an industrial chemical.

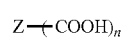
(10)

In the formula, n and Z have the same meanings as those defined in the above general formula (1).

Examples of the allyl halide include allyl chloride, allyl bromide, and allyl iodide. The amount of the allyl halide used is not particularly limited and is usually preferably in the range of 2 to 20 molar equivalents relative to the carboxylic acid compound represented by general formula (10). From the viewpoint of reaction rate and volumetric efficiency, the amount of the allyl halide used is more preferably 2.3 to 10 molar equivalents. The allyl halide is available as a reagent or an industrial chemical.

The allyl alcohol is available as a reagent or an industrial chemical. The amount of the allyl alcohol used is not particularly limited and is usually preferably in the range of 2 to 10 molar equivalents, and more preferably 2 to 5 molar equivalents, relative to the carboxylic acid compound represented by general formula (10).

Examples of the acidic substance include dodecylbenzenesulfonic acid and sulfuric acid. The amount of the acidic substance used is preferably in the range of 0.001 to 0.1 molar equivalents, and more preferably 0.005 to 0.05 molar equivalents, relative to the carboxylic acid compound represented by general formula (10).

Examples of the basic substance that may be generally used include an alkali metal hydroxide such as sodium hydroxide and potassium hydroxide; an alkali metal hydride such as sodium hydride and potassium hydride; an alkali metal carbonate such as sodium carbonate and potassium carbonate; an alkali metal bicarbonate such as sodium bicarbonate and potassium bicarbonate; and alcoholate. A hydroxide, a hydride, a carbonate, and a bicarbonate of an alkaline earth metal; a quaternary ammonium compound; and an organic base such as an aliphatic amine and an aromatic amine may also be used. The amount of the basic substance used is preferably in the range of 0.5 to 30 molar equivalents, and more preferably 2 to 15 molar equivalents, relative to the carboxylic acid compound represented by general formula (10).

Examples of the catalyst that may be used include a transition metal such as copper, iron, cobalt, nickel, chromium, and vanadium, and a transition metal salt. Of these, a copper compound is suitably used.

The copper compound used is not particularly limited and most copper compounds may be used. Preferred examples thereof include a copper halide such as cuprous chloride, cupric chloride, cuprous bromide, cupric bromide, cuprous iodide, and cuprous oxide; a copper salt of inorganic acid such as cuprous cyanide, cuprous sulfate, cupric sulfate, cupric phosphate, cuprous nitrate, and cupric nitrate; cupric hydroxide, copper carbonate, cuprous acetate, and cupric acetate. Of these, in particular, cuprous chloride, cupric chloride, cuprous bromide, cupric bromide, cuprous iodide, copper sulfate, and cupric acetate are suitable from the viewpoint of being readily available and inexpensive.

The reaction can be carried out in the presence or absence of a solvent. The solvent is not particularly limited as long as it does not adversely affect the reaction. Examples thereof include an aromatic hydrocarbon such as benzene, toluene, and xylene; a saturated aliphatic hydrocarbon such as hexane, heptane, octane, cyclohexane, and methylcyclohexane; an ether such as diethyl ether, diethylene glycol dimethyl ether, 1,4-dioxane, and tetrahydrofuran; an ester such as ethyl acetate and butyl acetate; a halogenated hydrocarbon such as methylene chloride, chloroform, and carbon tetrachloride; dimethylformamide, N-methyl pyrrolidone, and sulfolane. These may be used alone or in combination of two or more kinds. The amount of the solvent used is not particularly limited. The amount of the solvent used is preferably in the range of 0.01 to 20 times the weight of the carboxylic acid compound represented by general formula (10), and more preferably 0.1 to 10 times the weight thereof. In the case of the reaction, even when no solvent is used, the allyl compound can be efficiently prepared.

When the basic substance is used as an aqueous solution in the reaction, a phase transfer catalyst is preferably used to promote the reaction. The phase transfer catalyst is not particularly limited, and examples thereof include a quaternary ammonium salt such as trioctylmethylammonium chloride, tetrabutylammonium chloride, and tetrabutylammonium bromide; a phosphonium salt such as tetrabutylphosphonium chloride; and a crown ether such as 15-crown-5 and 18-crown-6. The amount of the phase transfer catalyst used is usually preferably in the range of 0.001 to 1 molar equivalent, and more preferably 0.01 to 0.4 molar equivalents, relative to the carboxylic acid compound represented by general formula (10).

The reaction temperature is preferably in the range of −30 to 150° C., and more preferably −10 to 130° C. from the view point of achieving high yield by maintaining a sufficient reaction rate and suppressing a side reaction effectively. The reaction time is preferably in the range of 10 minutes to 15 hours. From the viewpoint of suppression of a side reaction, the reaction time is preferably in the range of 10 minutes to 10 hours.

The reaction is preferably carried out under an atmosphere of an inert gas such as nitrogen or argon. The reaction can also be carried out under atmospheric pressure or under pressure, and preferably under atmospheric pressure from the viewpoint of production facilities. The reaction can be carried out, for example, by charging raw materials at once or separately in a stirring reactor and reacting the charged materials at the predetermined temperature for the predetermined time described above.

After completion of the reaction, the resulting mixture is neutralized. If required, the neutralized mixture is washed with water, saturated saline solution, or the like, and then concentrated. In addition, a purification operation that is usually used in the purification of organic compounds such as distillation and column chromatography is carried out, so that an allyl compound of high purity can be obtained.

(v) Method of Preparing the Allyl Polymer

The allyl compound may be polymerized by any method, including usual polymerization reactions. In the polymerization reaction, an unreacted allyl compound may be retrieved and subjected to polymerization reaction again. A polymerization initiator may be appropriately added as required in the polymerization reaction. The use of the polymerization initiator allows for production of a higher molecular weight polymer in a short time.

Examples of the polymerization initiator used in the polymerization reaction of the allyl compound include an azo polymerization initiator such as azobisisobutyronitrile and dimethyl 2,2'-azobisisobutyrate; a peroxide polymerization initiator such as a ketone peroxide, a peroxy ketal, a hydroperoxide, a dialkyl peroxide, a diacyl peroxide, a peroxy dicarbonate, a peroxy ester, and benzoyl peroxide; an acetophenone photopolymerization initiator such as 2-methyl-1-[4-(methylthio)phenyl]-2-morpholinopropane-1-one and 1-hydroxycyclohexyl phenyl ketone; a benzoin photopolymerization initiator such as benzoin and benzoin ethyl ether; a benzophenone photopolymerization initiator such as benzophenone; and a phosphorus photopolymerization initiator such as acylphosphine oxide. The photopolymerization initiator may be used in combination with a sensitizer including a sulfur compound such as thioxanthone, and a benzyl compound such as benzyl and 9,10-phenanthrenequinone.

The amount of the polymerization initiator added is preferably 5.0 parts by weight or less, more preferably 3.0 parts by weight or less, and further preferably 0.001 to 3.0 parts by weight, relative to 100 parts by weight of the allyl compound.

The reaction temperature during the polymerization is preferably 60 to 240° C., and more preferably 80 to 220° C. The reaction time is preferably 0.1 to 100 hours, and more preferably 1 to 30 hours.

The allyl polymer (a) having a monomer unit based on the allyl compound of the general formula (1) can be prepared by polymerizing the allyl compound of the general formula (1) by the above-mentioned method or by other methods. Hereinafter, the allyl polymer produced by polymerizing the "aliphatic allyl compound", the "alicyclic allyl compound", and the "aromatic allyl compound" are referred to as "aliphatic allyl polymer", "alicyclic allyl polymer", and "aromatic allyl polymer", respectively, in some cases.

Photocurable Compound (b)

The photocurable compound (b) of the present invention is not limited as long as it has photocurability, and can be used any compound usually used in this field. When the photocurable compound is liquid at room temperature (approximately 25° C.), a liquid photocurable resin composition comprising the liquid photocurable compound can be applicable to the coating method without additionally using a solvent.

The difference of the SP value of the photocurable compound (b) and the allyl polymer (a) is in the range of ±3.5. When the SP value is within this range, the compatibility between the photocurable compound (b) and the allyl polymer (a) can be enhanced, thereby improving workability during application of the photocurable resin composition to the base material. The degree of the compatibility can be determined by visually confirming the state of the mixture of the photocurable compound (b) and the allyl polymer (a). Specifically, the more transparent the mixture is, the higher the compatibility is, while the opaquer the mixture is due to suspension, the lower the compatibility is. In particular, the difference of the SP values between the aliphatic allyl polymer and the photocurable compound (b) is more preferably in the range of ±3.0, and further preferably ±2.5.

From the viewpoint of enhancement of the compatibility with the photocurable compound (b) or a solvent, as the allyl polymer (a), the aliphatic allyl polymer and the alicyclic allyl polymer are preferably used, and the aliphatic allyl polymer is more preferably used. The aliphatic allyl polymer and the alicyclic allyl polymer have higher compatibility with a compound having, in particular, an acryloyl group among the photocurable compound (b) below, than the aromatic allyl polymer. Thus, when the compound having an acryloyl group is used as the photocurable compound (b), the aliphatic allyl polymer and the alicyclic allyl polymer are suitable, and the aliphatic allyl polymer is particularly suitable.

As the photocurable compound (b), a vinyl compound having one or more groups having an ethylenically unsaturated double bond, or a cyclic ether compound having one or more groups having a cyclic ether bond, in particular, one or more epoxy groups, is preferably used alone or in combination of two or more kinds. That is, as the photocurable compound (b), it is preferable that a monofunctional compound such as a monofunctional vinyl compound having one group having an ethylenically unsaturated double bond, and a monofunctional cyclic ether compound having one cyclic ether group (in particular, an epoxy group) is used alone or in combination of two or more kinds; a polyfunctional compound such as a polyfunctional vinyl compound having two or more groups having an ethylenically unsaturated double bond (in particular, a polyfunctional (meth)acrylate having two or more (meth)acryloyl groups), and a polyfunctional cyclic ether compound having two or more cyclic ether groups (in particular, epoxy groups) is used alone or in combination of two or more kinds; or the monofunctional compound and the polyfunctional compound are used in combination. More preferably, the monofunctional compound and the polyfunctional compound are used in combination, or the polyfunctional compound is used alone or in combination of two or more kinds.

Vinyl Compound

Examples of the vinyl compound include an aliphatic, an alicyclic, and an aromatic (meth)acrylate monomer, an allyl monomer, a vinyl monomer, an urethane (meth)acrylate oligomer, an epoxy (meth)acrylate oligomer, and a polyester (meth)acrylate oligomer. As the vinyl compound, a mixture of two or more kinds of the compounds can also be used. Among the above-mentioned vinyl compounds, an aliphatic (meth)acrylate monomer and an epoxy (meth)acrylate oligomer are particularly preferable.

Examples of the aliphatic (meth)acrylate monomer include an alkyl (meth)acrylate such as butyl (meth)acrylate, lauryl (meth)acrylate, stearyl (meth)acrylate, 2-ethylhexyl (meth)acrylate, tetrahydrofurfuryl (meth)acrylate, and hydroxyethyl (meth)acrylate; a polyalkylene glycol di(meth)acrylate such as polyethylene glycol di(meth)acrylate; an alkanediol di(meth)acrylate such as dipropylene glycol di(meth)acrylate, tripropylene glycol di(meth)acrylate, 1,6-hexanediol di(meth)acrylate, 1,9-nonanediol di(meth)acrylate, and neopentyl glycol di(meth)acrylate; a (meth)acrylate having three or more functional groups such as trimethylolpropane tri(meth)acrylate, pentaerythritol tri(meth)acrylate ethylene oxide, propylene oxide-modified trimethylolpropane tri(meth)acrylate, pentaerythritol tetra(meth)acrylate, ditrimethylolpropane tetra(meth)acrylate, ethoxylated pentaerythritol penta(meth)acrylate, and dipentaerythritol hexa(meth)acrylate; an alkoxyalkylene glycol (meth)acrylate such as methoxypropylene glycol (meth)acrylate, and ethoxydiethylene glycol (meth)acrylate; and an N-substituted acrylamide such as (meth)acrylamide and N-butoxymethyl (meth)acrylamide. Of these, the (meth)acrylate having two or more functional groups such as dipropylene glycol di(meth)acrylate, pentaerythritol tetra(meth)acrylate, and dipentaerythritol hexa(meth)acrylate is preferable.

Examples of the alicyclic (meth)acrylate monomer include cyclohexyl (meth)acrylate, dicyclopentadienyl di(meth)acrylate, and isobornyl (meth)acrylate, and isobornyl (meth)acrylate is preferable.

Examples of the aromatic (meth)acrylate monomer include phenyl (meth)acrylate, benzyl (meth)acrylate, phenoxyethyl (meth)acrylate, phenoxydiethylene glycol (meth)acrylate, ethoxylated bisphenol A di(meth)acrylate, and ethoxylated bisphenol F di(meth)acrylate, and ethoxylated bisphenol A di(meth)acrylate is preferable.

Examples of the allyl monomer include tri(meth)allyl isocyanurate, and tri(meth)allyl cyanurate, and tri(meth)allyl isocyanurate is preferable.

Examples of the vinyl monomer include styrene, α-methylstyrene, divinylbenzene, N-vinyl pyrrolidone, N-vinyl formamide, N-vinyl caprolactam, vinyl acetate, methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, isopentyl vinyl ether, tert-pentyl vinyl ether, n-hexyl vinyl ether, isohexyl vinyl ether, 2-ethyl hexyl vinyl ether, allyl vinyl ether, 2-(2-vinyloxyethoxy)ethyl acrylate, methoxyethyl vinyl ether, ethoxyethyl vinyl ether, acetoxymethyl vinyl ether, hydroxypropyl vinyl ether, diethylene glycol monovinyl ether, triethylene glycol monovinyl ether, tetra ethylene glycol monovinyl ether, propylene glycol monovinyl ether, dipropylene glycol monovinyl ether, tripropylene glycol monovinyl ether, trimethylolpropane monovinyl ether, ethylene oxide adduct trimethylolpropane monovinyl ether, pentaerythritol monovinyl ether, propylene oxide adduct pentaerythritol monovinyl ether, glycidyl vinyl ether, cyclohexyl vinyl ether, phenyl vinyl ether, diethylene glycol ethyl vinyl ether, triethylene glycol methyl vinyl ether, divinyl ether, propylene glycol divinyl ether, dipropylene glycol divinyl ether, tripropylene glycol divinyl ether, neopentyl glycol divinyl ether, ethylene oxide adduct pentaerythritol tetravinyl ether, ditrimethylolpropane tetravinyl ether, and dipentaerythritol hexavinyl ether, and 2-(2-vinyloxyethoxy)ethyl acrylate is preferable.

Examples of the urethane (meth)acrylate oligomer include polyether urethane (meth)acrylate obtained by subjecting ether glycol such as ethylene glycol to chain extension using diisocyanate, and (meth)acrylating both terminals thereof; polyester urethane (meth)acrylate obtained using polyester glycol instead of ether glycol; and those obtained using caprolactone diol, polycarbonate diol, or the like, and polyether urethane (meth)acrylate is preferable.

Examples of the epoxy (meth)acrylate oligomer include a reaction product obtained by reacting (meth)acrylic acid with an epoxy group, such as a bisphenol A-type epoxy resin, a novolac-type epoxy resin, and an epoxidized oil type. A compound in which (meth)acrylic acids are added to each epoxy group in the compound having two or more epoxy groups is preferable. As such compound, a (meth) acrylic acid adduct of bisphenol A glycidyl ether, a (meth) acrylic acid adduct of hexahydrophthalic acid diglycidyl ether, and a (meth)acrylic acid adduct of trimethylolpropane polyglycidyl ether are preferable.

Examples of the polyester (meth)acrylate oligomer include those obtained by subjecting a polybasic acid and a polyalcohol to polycondensation to produce a polyester having a hydroxyl group or a carboxyl group, and thereafter, subjecting the hydroxyl group in the polyester and (meth) acrylic acid to esterification or subjecting the carboxyl group and a (meth)acrylate having hydroxyl group to esterification. An aliphatic polyester tetra(meth)acrylate is preferable.

Cyclic Ether Compound

Examples of the cyclic ether compound include glycidyl (meth)acrylate, methyl glycidyl (meth)acrylate, 4-(glycidyloxy)butyl (meth)acrylate, 3-methyl-3,4-epoxybutyl (meth) acrylate, 3-ethyl-3,4-epoxybutyl (meth)acrylate, 4-methyl-4,5-epoxypentyl (meth)acrylate, 5-methyl-5,6-epoxyhexyl (meth)acrylate, α-ethyl glycidyl acrylate, allyl glycidyl ether, crotonyl glycidyl ether, glycidyl (iso)crotonate ether, (3,4-epoxycyclohexyl)methyl(meth)acrylate, N-(3,5-dimethyl-4-glycidyl)benzylacrylamide, o-vinylbenzyl glycidyl ether, m-vinylbenzyl glycidyl ether, p-vinylbenzyl glycidyl ether, α-methyl-o-vinylbenzyl glycidyl ether, α-methyl-m-vinylbenzyl glycidyl ether, α-methyl-p-vinylbenzyl glycidyl ether, 2,3-diglycidyloxymethyl styrene, 2,4-diglycidyloxymethyl styrene, 2,5-diglycidyloxymethyl styrene, 2,6-diglycidyloxymethyl styrene, 2,3,4-triglycidyloxymethyl styrene, 2,3,5-triglycidyloxymethyl styrene, 2,3,6-triglycidyloxymethyl styrene, 3,4,5-triglycidyloxymethyl styrene, 2,4,6-triglycidyloxymethyl styrene, 3',4'-epoxycyclohexylmethyl-3,4-epoxycyclohexane carboxylate, 3-methoxyoxetane, 3-ethoxyoxetane, 3-propoxyoxetane, 3-isopropoxyoxetane, 3-ethyl-3-hydroxymethyloxetane, 1,4-bis[(3-ethyl-3-oxetanyl)methoxymethyl]benzene, 3-ethyl-3-(phenoxymethyl)oxetane, di(1-ethyl-3-oxetanyl)methyl ether, 3-ethyl-3-(2-ethylhexyloxymethyl)oxetane, and di(1-methyl-3-oxetanyl)methyl ether. A compound formed from an aliphatic hydrocarbon and/or an alicyclic hydrocarbon and an epoxy group and containing no aromatic ring, such as 3',4'-epoxycyclohexylmethyl-3,4-epoxycyclohexane carboxylate, is preferable.

The compounds described above can be used alone or in combination of two or more, as the photocurable compound (b) used in the present invention. When they are used in combination of two or more, in particular, a mixture of bisphenol A glycidyl ether acrylic acid adduct and dipropylene glycol diacrylate, and a mixture of pentaerythritol tetraacrylate and isobornyl acrylate are preferable. When two or more kinds thereof are used in combination, they can be mixed at an arbitrary ratio.

The amount of the photocurable compound (b) is preferably 50 to 10,000 parts by weight, more preferably 100 to 5,000 parts by weight, and further preferably 150 to 2,000 parts by weight, even more preferably 150 to 1,000 parts by weight, relative to 100 parts by weight of the allyl polymer (a) in the photocurable resin composition.

When the photocurable resin composition is used as an adhesive, a compound not having acryloyl group, specifically, the allyl monomer or the vinyl monomer as the vinyl compound described above, or a compound not having acryloyl group among the cyclic ether compounds described above, is preferably used as the photocurable compound (b) to be combined with the allyl polymer (a) from the viewpoint of ensuring adhesion to an adherend.

The ratio by weight of the allyl polymer (a) to the photocurable compound (b) (a:b) in the photocurable resin composition may be in the range of 1:99 to 60:40, preferably 2:98 to 50:50, and more preferably 5:95 to 40:60. When the ratio is within the above range, both the allyl polymer (a) and the photocurable compound (b) are dissolved without precipitating the allyl polymer (a). Thus, the photocurable resin composition achieves excellent wettability with the coated film and excellent adhesion to the base material after curing.

Photopolymerization Initiator (c)

As the photopolymerization initiator, a photoradical polymerization initiator, a photocationic polymerization initiator, or the like can be used. Examples of the photoradical polymerization initiator include an alkylphenone-based photopolymerization initiator such as 2-methyl-1-[4-(methylthio)phenyl]-2-morpholinopropan-1-one, 1-hydroxy-cyclohexylphenyl ketone, 2-hydroxy-2-methyl-1-phenylpropane-1-one, and 2-(dimethylamino)-2-[(4-methylphenyl)methyl]-1-[4-(4-morpholinyl)phenyl]-1-butanone; an acylphosphine oxide-based photopolymerization initiator such as 2,4,6-trimethylbenzoyl-diphenyl-phosphine oxide, and bis(2,4,6-trimethylbenzoyl)-phenylphosphine oxide; a benzoin-based photopolymerization initiator such as benzoin ethyl ether; a benzophenone-based photopolymerization initiator such as benzophenone; and an oxime ester-based photopolymerization initiator such as 1,2-octanedione,1-[4-(phenylthio)-,2,-(-benzoyloxime)]. The photoradical polymerization initiator may be used in combination of a sensitizer such as a benzyl compound including benzyl or 9,10-phenanthrenequinone.

Examples of the photocationic polymerization initiator include an onium salt-based photopolymerization initiator such as iodonium, (4-methylphenyl)[4-(2-methylpropyl) phenyl]-hexafluorophosphate, triaryl sulfonium hexafluorophosphate, and triarylsulfonium tetrakis-(pentafluorophenyl)borate.

When the vinyl compound is used as the photocurable compound (b), the photoradical polymerization initiator is preferably used as the photopolymerization initiator (c). When the cyclic ether compound is used as the photocurable compound (b), the photocationic polymerization initiator is preferably used as the photopolymerization initiator (c).

The photopolymerization initiator is preferably contained in an amount in the range of 0.1% to 15% by weight, more preferably 0.3% to 12% by weight, and further preferably 0.5% to 10% by weight, of the total amount of the photocurable resin composition.

A photopolymerization assistant (e.g., an amine photopolymerization assistant such as triethanolamine) may be used in the photocurable resin composition. The photopolymerization assistant is preferably contained in an amount in the range of 0.05% to 5% by weight, and more preferably 0.1% to 3% by weight, of the total amount of the photocurable resin composition.

Preferred combination for the photocurable resin composition include a combination of the allyl polymer (a), the mixture of the bisphenol A glycidyl ether acrylic acid adduct and dipropylene glycol diacrylate as the photocurable compound (b), and the radical photopolymerization initiator, in particular, the alkylphenone-based radical photopolymerization initiator, or in further particular, 1-hydroxy-cyclohexylphenyl ketone as the photopolymerization initiator (c); a combination of the allyl polymer (a), pentaerythritol tetra(meth)acrylate as the photocurable compound (b), and the radical photopolymerization initiator, in particular, the alkylphenone-based radical photopolymerization initiator, or in further particular, 1-hydroxy-cyclohexylphenyl ketone as the photopolymerization initiator (c); and a combination of the allyl polymer (a), 3',4'-epoxycyclohexylmethyl-3,4-epoxycyclohexane carboxylate as the photocurable compound (b), and the cationic photopolymerization initiator, in particular, the onium salt-based photopolymerization initiator, or in further particular, triarylsulfonium tetrakis-(pentafluorophenyl)borate as the photopolymerization initiator (c).

(d) Other Components

The photocurable resin composition may contain various additives depending on the purpose, and examples of the additives include a thickener, a plasticizer, a filler, a fire retardant, a solvent (e.g., an alcohol such as ethanol, propanol, butanol, hexanol, and ethylene glycol; a halogenated hydrocarbon such as 1,1-dichloroethane and chlorobenzene; an ether such as diethylether and tetrahydrofuran; a glycol monoether such as ethylene glycol monomethyl ether and ethylene glycol monoethyl ether; a ketone such as acetone and methyl ethyl ketone; an amide such as N,N-dimethylformamide; a pyrrolidone such as N-methyl pyrrolidone; and a lactone such as γ-butyrolactone), a viscosity modifier, a stabilizer (e.g., a polymerization inhibitor such as hydroquinone and methoquinone), and a coloring agent (e.g., a pigment such as cyanine blue, disazo yellow, carmine 6b, lake red C, carbon black, and titanium white). The solvent may be used from the viewpoint of improving handleability when the photocurable resin composition has a high viscosity, and may not be used. When the solvent is used, the amount of the solvent is preferably in the range of 10 to 300 parts by weight, and more preferably 10 to 100 parts by weight, relative to 100 parts by weight of the photocurable resin composition.

The photocurable resin composition of the present invention can be prepared by mixing the allyl polymer (a) with the photocurable compound (b), the photopolymerization initiator (c), and optionally the above-mentioned photopolymerization assistant and the above-mentioned additive (e.g., the stabilizer or the pigment). The photocurable resin composition of the present invention is cured by exposure to light.

When the photocurable resin composition is used as an adhesive, for example, a glass substrate such as alkali glass and borosilicate glass; a metal substrate such as aluminum, iron, and copper; an inorganic substrate such as silicon; or a plastic film substrate such as polyimide, polyamide imide, polyamide, polyether imide, polyether ether ketone, polyether ketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyarylate, acrylic resin, polyvinyl alcohol, polypropylene, cellulose, triacetyl cellulose or partially saponified triacetyl cellulose, epoxy resin, phenol resin, and norbornene resin may be used as a substrate. The film substrate may be a stretched film substrate of a uniaxially- or biaxially-stretched film. The stretched film substrate may be subjected to surface treatment such as saponification treatment, corona treatment, or plasma treatment in advance.

Further, when the photocurable resin composition is used as an adhesive, a reinforcing material may be contained in order to improve strength of the cured product. As the reinforcing material, a glass fiber; or an electrically insulating whisker of aluminum borate, magnesium borate, barium titanate, potassium titanate, silicon carbide, silicon nitride, or alumina can be used. When the reinforcing material is added, the amount of the reinforcing material is preferably in the range of approximately 1 to 10 parts by weight relative to 100 parts by weight of the total amount of the photocurable resin composition.

Cured Product

A cured product is obtained by curing the photocurable resin composition of the present invention. The thickness of the cured product is not particularly limited, and can be in a wide range of several µm (e.g., 3 µm) to approximately 10 mm. When the cured product is used as an adhesive, the thickness of the cured product may be 10 µm or more, further 50 µm or more, and even further 100 µm or more, and the thickness thereof may be 10 mm or less, further 5 mm or less, and even further 1 mm or less. Since the photocurable resin composition exhibits excellent deep curability, it is sure to obtain the cured product having a general thickness of several µm, and it is possible to obtain the cured product having a thickness of approximately 10 µm to 1 mm.

The cured product can be obtained by exposing the photocurable resin composition to light. The light used in the curing is typically ultraviolet rays.

When two or more layers each of which has a photocurable resin composition satisfying the element of the present invention and being different in formulation are cured to give a laminated cured product, each of the cured layers may have a thickness in the above range.

The curing reaction of the photocurable resin composition may be carried out with any curing apparatus under any curing condition, and a method commonly used for photocuring reaction is used.

The cured product can be used in any application. The cured product may be used in various applications, for example, coating materials, inks, adhesives, protective films, photoresists, and insulating films. Since the photocurable resin composition exhibits excellent deep curability, it may be suitably used in coating materials, coating varnishes, adhesives for laminating, sealants, and resist films that are require to form thick films, and most preferably used in adhesives.

In particular, the aliphatic allyl polymer as the allyl polymer (a) has excellent compatibility with the photocurable compound (b), various other compounds, or solvents. Therefore, the use of a composition containing the aliphatic allyl polymer can eliminate the problem of low compatibility that has conventionally been caused in application of the coating materials or the like. Further, since a composition containing the alicyclic allyl polymer or the aromatic allyl polymer as the allyl polymer (a) has excellent deep curability, it is useful particularly in applications of adhesives. In particular, the composition containing the aromatic allyl polymer has a low curing shrinkage, so that when it is used as an adhesive, the deformation of the adherend can be suppressed.

Further, the composition containing the aliphatic allyl polymer or the alicyclic allyl polymer as the allyl polymer (a) can be suitably used in food contact applications.

The present application claims the priority benefit of Japanese Patent Application No. 2016-071789 filed on Mar. 31, 2016. The entire content of the specification of Japanese Patent Application No. 2016-071789 filed on Mar. 31, 2016 is incorporated herein by reference.

EXAMPLES

The present invention will be described in more detail below by means of examples, without intending to limit the present invention thereto. The present invention can be modified according to the purpose described above and below, and any of the modifications are included in the technical scope of the present invention.

Production Example 1 of Allyl Polymer

Into a 1 L three-neck round bottom flask placed in an oil bath, 150 g of succinic anhydride (manufactured by Wako Pure Chemical Industries, Ltd.), 200 g of allyl alcohol (manufactured by Osaka Soda Co., Ltd.), 200 g of toluene (manufactured by Wako Pure Chemical Industries, Ltd.), and 2 g of 95% sulfuric acid (manufactured by Futaba Pure Chemical Co., Ltd.) were added, and the temperature of the oil bath was increased to 120° C. while the mixture was stirred. The stirred mixture was kept stirring for 6 hours at this temperature and thereafter air-cooled to room temperature. To the cooled product was added 200 g of a 10% sodium carbonate solution (manufactured by Futaba Pure Chemical Co., Ltd.), and the mixture was allowed to stand to remove only the aqueous layer. Further, 200 g of salt water was added thereto to take out an organic layer. The organic layer was concentrated by an evaporator and then charged in a 3 L four-neck round bottom flask. The temperature of the bath was increased to 130° C., the mixture was kept stirring for 6 hours at this temperature and thereafter air-cooled to room temperature. Thereto was added 1 L of hexane (manufactured by Wako Pure Chemical Industries, Ltd.). The mixture was roughly stirred and then allowed to stand. A supernatant liquid was taken out therefrom and hexane was removed by the evaporator. Again, addition and removal of hexane were repeated, and the content was transferred to a tray and then placed in a vacuum dryer, followed by removing monomer components until there was no longer any weight change, to obtain approximately 80 g of a diallyl succinate polymer (polymer a-4). Thereafter, the weight average molecular weight was measured by GPC.

Production Example 2 of Allyl Polymer

Into a 3 L four-neck round bottom flask in an oil bath, 400 g of diallyl adipate (manufactured by Tokyo Chemical Industry Co., Ltd.) was added. The temperature of the bath was increased to 140° C., and the charged substance was kept stirring for 5 hours at this temperature and thereafter air-cooled to room temperature. Thereto was added 1 L of hexane (manufactured by Wako Pure Chemical Industries, Ltd.). The mixture was roughly stirred and then allowed to stand. A supernatant liquid was taken out therefrom and hexane was removed by the evaporator. Again, addition and removal of hexane were repeated, and the content was transferred to a tray and then placed in a vacuum dryer, followed by removing monomer components until there was no longer any weight change, to obtain approximately 80 g of a diallyl adipate polymer (polymer a-5). Thereafter, the weight average molecular weight was measured by GPC.

Production Example 3 of Allyl Polymer

Into a 3 L four-neck round bottom flask in an oil bath, 320 g of triallyl citrate (manufactured by Tokyo Chemical Industry Co., Ltd.) was added. The temperature of the bath was increased to 140° C., and the charged substance was kept stirring for 2 hours at this temperature and thereafter air-cooled to room temperature. Thereto was added 1 L of hexane (manufactured by Wako Pure Chemical Industries, Ltd.). The mixture was roughly stirred and then allowed to stand. A supernatant liquid was taken out therefrom and hexane was removed by the evaporator. Again, addition and removal of hexane were repeated, and the content was transferred to a tray and then placed in a vacuum dryer, followed by removing monomer components until there was no longer any weight change, to obtain approximately 80 g of a triallyl citrate polymer (polymer a-6). Thereafter, the weight average molecular weight was measured by GPC.

Production Example 4 of Allyl Polymer

First, diallyl 1,2-cyclohexanedicarboxylate was prepared by an esterification reaction between cyclohexanedicarboxylic anhydride and allyl alcohol. Next, 2,400 g of diallyl 1,2-cyclohexanedicarboxylate was added to a 3 L separable flask, and 60 g of benzoyl peroxide was added thereto, followed by stirring with heating at 80° C. After 2.5 hours of reaction, the reaction mixture was cooled to 30° C. After the cooling, methanol was added to the flask to precipitate a polymer. The polymer was then dried under reduced pressure at 40° C. for 16 hours (amount produced: 408 g, yield: 17%, Mw=50,000), to obtain a diallyl 1,2-cyclohexanedicarboxylate polymer (polymer a-7).

The weight average molecular weights of the polymers obtained in production examples described above and the polymers a-1 to a-3 to be described later were measured under the following conditions.

The weight average molecular weight (Mw) is a value in terms of standard polystyrene measured by GPC system LC-2030, manufactured by Shimadzu Corporation.

Column: two Shodex LF-804 and one LF-G were connected in series
Flow rate: 1.0 mL/min
Temperature: 40° C.
Detection: RID-6A
Sample: A measurement sample was prepared by dissolving 50 mg of a sample in 5 mL of tetrahydrofuran.

Examples 1 to 21 and Comparative Examples 1 to 3

Photocurable resin compositions with the components described in Tables 1 to 3 were prepared. The unit of the numerical values on the components in Tables 1 to 3 are parts by weight. Specifically, predetermined amounts of the components of the photocurable resin composition shown in Tables 1 to 3 were added into a round bottom flask, and the components in the flask were preliminarily stirred with a stirrer at room temperature. Thereafter, the temperature thereof was increased to 60° C. in a water bath with stirring, and the stirred components were kept at the temperature for 1 hour and then air-cooled to room temperature, to thereby obtain a photocurable resin composition.

The abbreviations in Table 1 has the following meanings:

b-1: a mixture of bisphenol A glycidyl ether acrylic acid adduct (epoxy ester 300A manufactured by Kyoeisha Chemical Co., Ltd.) and dipropylene glycol diacrylate (APG-100 manufactured by Shin-Nakamura Chemical Co., Ltd.) at a weight ratio of 50:50 (SP value 11.0)

b-2: a mixture of pentaerythritol tetraacrylate (LIGHT ACRYLATE PE-4A manufactured by Kyoeisha Chemical Co., Ltd.) and isobornyl acrylate (IBXA manufactured by Osaka Organic Chemical Industry Ltd.) at a weight ratio of 50:50 (SP value 8.0)

b-3: 3',4'-epoxycyclohexylmethyl-3,4-epoxycyclohexane carboxylate (Celloxide 2021P manufactured by Daicel Corporation) (SP value 12.5)

a-1: diallyl orthophthalate polymer (DAP K manufactured by Osaka Soda Co., Ltd., Mw 30,000, SP value 11.3)

a-2: diallyl orthophthalate polymer (DAP A manufactured by Osaka Soda Co., Ltd., Mw 50,000, SP value 11.3)

a-3: diallyl isophthalate polymer (ISO DAP manufactured by Osaka Soda Co., Ltd., Mw 60,000, SP value 11.0)

a-4: diallyl succinate polymer (Production Example 1, Mw 60,000, SP value 10.5)

a-5: diallyl adipate polymer (Production Example 2, Mw 60,000, SP value 10.2)

a-6: triallyl citrate polymer (Production Example 3, Mw 340,000, SP value 11.0)

a-7: diallyl 1,2-cyclohexanedicarboxylate polymer (Production Example 4, Mw 50,000, SP value 10.7)

c-1: 1-hydroxy-cyclohexyl-phenyl-ketone (Irgacure 184 manufactured by BASF Japan)

c-2: triaryl sulfonium tetrakis-(pentafluorophenyl)borate (Irgacure 290 manufactured by BASF Japan)

The SP values are calculated from Fedors' equation. The unit of the above SP value is $(cal/cm^3)^{1/2}$.

The photocurable resin composition thus obtained was evaluated by the following method in terms of appearance, accumulated amount of light (in the case of film thicknesses of 1 mm and 10 μm) required for curing, deep curability, curing shrinkage, and pencil hardness. The results are shown in Tables 1 to 3.

Appearance Evaluation

The appearance of the photocurable resin composition was evaluated by visually observing the photocurable resin composition that was produced and then air-cooled to room temperature.

Good: Transparent

Poor: Cloudy

Method of Measuring Accumulated Amount of Light Required for Curing

The accumulated amount of light required for curing was measured by the following method.

A Teflon (registered trademark) tape was superimposed on a 100 mm square×0.1 mm-thick PET film (Lumirror S10 manufactured by Toray Industries, Inc.) in advance to prepare a spacer having predetermined thickness. Thereto was added dropwise the photocurable resin composition, and a bar coater (BARCOATER manufactured by Yasuda Seiki Seisakusho, Ltd.) was used to apply the composition, to thereby obtain a coated film. The PET film thus coated was cured by irradiating the coated film with ultraviolet rays at an illuminance of 100 mW/cm² by using a device having a metal halide lamp as a light source (UVX-02516S1AJU01 manufactured by Ushio Inc.). The curing of the coated film was confirmed by a finger touch, and the accumulated amount of light (=illuminance×time) until the curing was confirmed was measured. The above measurement was carried out under two conditions of the cured products having thicknesses of 1 mm and 10 μm.

Method of Evaluating Deep Curability

A Teflon (registered trademark) tape was superimposed on a glass plate to which a fluorine-based mold releasing agent (GA-7500 manufactured by Daikin Industries, Ltd.) was applied and dried to fix, to prepare a spacer having a thickness of 3 mm. Thereto was added dropwise the photocurable resin composition, and a bar coater (BARCOATER manufactured by Yasuda Seiki Seisakusho, Ltd.) was used to apply the composition, to thereby obtain a coated film. The coated film was irradiated with ultraviolet rays by using a device having a metal halide lamp as a light source (UVX-02516S1AJU01 manufactured by Ushio Inc.), and the accumulated amount of light was 200 mJ/cm². After the irradiation, the coated film was detached from the glass plate, and whether a liquid uncured product remained on the glass plate or not was visually evaluated with a microscope.

Good: Not remain

Poor: Remained

Method of Evaluating Curing Shrinkage

The photocurable resin composition was added dropwise to the whole surface of a 50 mm square×0.1 mm-thick PET film (Lumirror S10 manufactured by Toray Industries, Inc.), and a bar coater (BARCOATER manufactured by Yasuda Seiki Seisakusho, Ltd.) was used to apply the composition, to thereby obtain a coated film having a thickness of 0.03 mm. The coated film was irradiated with ultraviolet rays by using a device having a metal halide lamp as a light source (UVX-02516S1AJU01 manufactured by Ushio Inc.), and the accumulated amount of light was 200 mJ/cm². After the irradiation, one side of the PET film was fixed, and the height of the warp of the other side opposite to the one side thereof was measured.

Method of Evaluating Hardness of Coated Film

The photocurable resin composition was added dropwise to the whole surface of a 50 mm square×0.1 mm-thick PET film (Lumirror S10 manufactured by Toray Industries, Inc.), and a bar coater (BARCOATER manufactured by Yasuda Seiki Seisakusho, Ltd.) was used to apply the composition, to thereby obtain a coated film having a thickness of 0.03 mm. The coated film was irradiated with ultraviolet rays by using a device having a metal halide lamp as a light source (UVX-02516S1AJU01 manufactured by Ushio Inc.), and the accumulated amount of light was 200 mJ/cm². After the irradiation, the coated film scratched with a Mitsubishi pencil while applying a test load of 750±10 g thereto. The hardness of the pencil was increased stepwise until a scratch was left on the film. The hardness of the hardest pencil of all which did not leave the scratch was recorded. The pencil hardness is 2H, H, F, HB, B, 2B, and 3B in order from highest to lowest hardness.

TABLE 1

|  |  | Examples |||||||| Comparative |
|  |  | 1 | 2 | 3 | 4 | 5 | 6 | 7 | 8 | Example 1 |
| --- | --- | --- | --- | --- | --- | --- | --- | --- | --- | --- |
| Photocurable compound (b) | b-1 | 90 | 70 | 90 | 90 | 90 | 90 | 90 | 90 | 100 |
| Allyl polymer (a) | a-1 |  |  | 10 |  |  |  |  |  |  |
|  | a-2 | 10 | 30 |  |  |  |  |  |  |  |
|  | a-3 |  |  |  | 10 |  |  |  |  |  |
|  | a-4 |  |  |  |  | 10 |  |  |  |  |
|  | a-5 |  |  |  |  |  | 10 |  |  |  |
|  | a-6 |  |  |  |  |  |  | 10 |  |  |
|  | a-7 |  |  |  |  |  |  |  | 10 |  |
| Photopolymerization initiator (c) | c-1 | 10 | 10 | 10 | 10 | 10 | 10 | 10 | 10 | 10 |
| Appearance | — | Good | Good | Good | Good | Good | Good | Good | Good | Good |
| Accumulated amount of light (thicknesses of 1 mm) | mJ/cm$^2$ | 130 | 120 | 135 | 125 | 132 | 130 | 138 | 135 | 215 |
| Accumulated amount of light (thicknesses of 10 μm) | mJ/cm$^2$ | 131 | 121 | 137 | 126 | 133 | 131 | 139 | 130 | 216 |
| Deep curability | — | Good | Good | Good | Good | Good | Good | Good | Good | Poor |
| Curing shrinkage | mm | 8 | 6 | 7 | 9 | 10 | 9 | 9 | 9 | 15 |
| Pencil hardness | — | F | H | F | F | F | F | F | F | HB |

TABLE 2

|  |  | Examples |||||||| Comparative |
|  |  | 9 | 10 | 11 | 12 | 13 | 14 | 15 | 16 | Example 2 |
| --- | --- | --- | --- | --- | --- | --- | --- | --- | --- | --- |
| Photocurable compound (b) | b-2 | 90 | 70 | 90 | 90 | 90 | 90 | 90 | 90 | 100 |
| Allyl polymer (a) | a-1 |  |  | 10 |  |  |  |  |  |  |
|  | a-2 | 10 | 30 |  |  |  |  |  |  |  |
|  | a-3 |  |  |  | 10 |  |  |  |  |  |
|  | a-4 |  |  |  |  | 10 |  |  |  |  |
|  | a-5 |  |  |  |  |  | 10 |  |  |  |
|  | a-6 |  |  |  |  |  |  | 10 |  |  |
|  | a-7 |  |  |  |  |  |  |  | 10 |  |
| Photopolymerization initiator (c) | c-1 | 10 | 10 | 10 | 10 | 10 | 10 | 10 | 10 | 10 |
| Appearance | — | Good | Good | Good | Good | Good | Good | Good | Good | Good |
| Accumulated amount of light (thicknesses of 1 mm) | mJ/cm$^2$ | 130 | 120 | 138 | 123 | 130 | 130 | 140 | 132 | 210 |
| Accumulated amount of light (thicknesses of 10 μm) | mJ/cm$^2$ | 131 | 122 | 139 | 124 | 133 | 132 | 140 | 135 | 212 |
| Deep curability | — | Good | Good | Good | Good | Good | Good | Good | Good | Poor |
| Curing shrinkage | mm | 8 | 6 | 7 | 10 | 10 | 10 | 10 | 8 | 18 |
| Pencil hardness | — | F | H | F | F | F | F | F | F | B |

TABLE 3

|  |  | Examples |||||||| Comparative |
|  |  | 17 | 18 | 19 | 20 | 21 | 22 | 23 | 24 | Example 3 |
| --- | --- | --- | --- | --- | --- | --- | --- | --- | --- | --- |
| Photocurable compound (b) | b-3 | 90 | 70 | 90 | 90 | 90 | 90 | 90 | 90 | 100 |
| Allyl polymer (a) | a-1 |  |  | 10 |  |  |  |  |  |  |
|  | a-2 | 10 | 30 |  |  |  |  |  |  |  |
|  | a-3 |  |  |  | 10 |  |  |  |  |  |
|  | a-4 |  |  |  |  | 10 |  |  |  |  |
|  | a-5 |  |  |  |  |  | 10 |  |  |  |
|  | a-6 |  |  |  |  |  |  | 10 |  |  |
|  | a-7 |  |  |  |  |  |  |  | 10 |  |
| Photopolymerization initiator (c) | c-2 | 10 | 10 | 10 | 10 | 10 | 10 | 10 | 10 | 10 |
| Appearance | — | Good | Good | Good | Good | Good | Good | Good | Good | Good |
| Accumulated amount of light (thicknesses of 1 mm) | mJ/cm$^2$ | 314 | 311 | 310 | 315 | 316 | 316 | 317 | 315 | 323 |
| Accumulated amount of light (thicknesses of 10 μm) | mJ/cm$^2$ | 421 | 420 | 421 | 412 | 420 | 421 | 422 | 421 | 435 |
| Deep curability | — | Good | Good | Good | Good | Good | Good | Good | Good | Poor |
| Curing shrinkage | mm | 7 | 5 | 7 | 8 | 8 | 8 | 8 | 7 | 10 |
| Pencil hardness | — | H | H | F | F | F | F | F | F | HB |

It can be seen that the photocurable resin compositions adding the allyl polymer in Examples 1 to 23 are more excellent in deep curability than those not adding the allyl polymer in Comparative Examples 1 to 3 are. In addition, the results of the accumulated amount of light required for curing show that the photocurable resin compositions in Examples 1 to 23 have more excellent quick-drying properties than those in Comparative Examples 1 to 3 do.

It can be seen from the comparisons between Examples 1 and 2, and between Examples 9 and 10 that in the addition of allyl polymer of the same kind and the same molecular weight, the larger the amount of allyl polymer added is, the more excellent the quick-drying properties are. It can be seen from the comparisons between Examples 1 and 3, and between Examples 9 and 11 that the photocurable resin composition using a larger weight average molecular weight of the allyl polymer has more excellent quick-drying properties in the addition of allyl polymer of the same kind and the same amount.

It can be seen that in the formulations, since the photocurable resin compositions adding the allyl polymer in Examples 1 to 23 have smaller values of curing shrinkage than those not adding the allyl polymer in Comparative Examples 1 to 3 do. In other words, the photocurable resin composition not adding the allyl polymer is small in curing shrinkage. Therefore, the addition of the allyl polymer is effective at suppressing a warp in the base material.

It can be seen that in the formulations, the photocurable resin compositions adding the allyl polymer in Examples 1 to 23 have higher pencil hardness than those not adding the allyl polymer in Comparative Examples 1 to 3 do. Therefore, the addition of the allyl polymer is effective at increasing the coated film hardness.

In the formulations, from the comparisons between Examples 1 to 3 and Examples 4 to 8, between Examples 9 to 11 and Examples 12 to 15, and between Examples 17 to 19 and Examples 20 to 23, when the aromatic allyl polymer is used, in particular, when diallyl orthophthalate polymer or diallyl isophthalate polymer is used, the photocurable resin composition has a small value of curing shrinkage, and can suppress deformation of an adherend when used as an adhesive. It can be seen that in any of examples, the photocurable resin composition has a pencil hardness of H or F and is suitable as an insulating film or a protective film such as a coating varnish.

The invention claimed is:

1. A photocurable resin composition comprising:
   an allyl polymer (a) produced by polymerization of an allyl compound, wherein the allyl compound is any one selected from the group consisting of diallyl oxalate, diallyl malonate, diallyl succinate, diallyl glutarate, diallyl adipate, diallyl pimelate, diallyl suberate, diallyl azelate, diallyl sebacate, diallyl fumarate, diallyl maleate, diallyl malate, diallyl tartrate, triallyl citrate, and diallyl itaconate;
   a photocurable compound (b); and
   a photopolymerization initiator (c),
   wherein the photocurable resin composition does not comprise a solvent.

2. The photocurable resin composition according to claim 1, wherein the allyl polymer (a) has the SP value of 9.5 to 12.5.

3. The photocurable resin composition according to claim 1, being used as an adhesive.

4. A cured product obtained by curing the photocurable resin composition according to claim 1.

5. The photocurable resin composition according to claim 2, being used as an adhesive.

6. A cured product obtained by curing the photocurable resin composition according to claim 2.

* * * * *